United States Patent [19]

Malinowski et al.

[11] Patent Number: 4,699,221

[45] Date of Patent: Oct. 13, 1987

[54] CHISEL PLOW RELEASE MECHANISMS

[75] Inventors: Leon A. Malinowski; Kenneth J. Lange, both of Yorkton, Canada

[73] Assignee: Leon's Mfg. Co. Ltd., Saskatchewan, Canada

[21] Appl. No.: 767,445

[22] Filed: Aug. 20, 1985

[30] Foreign Application Priority Data

Jan. 29, 1985 [CA] Canada .................................. 473033

[51] Int. Cl.⁴ .............................................. A01B 61/04
[52] U.S. Cl. ..................................... 172/705; 172/265
[58] Field of Search ............... 172/705, 707, 708, 710, 172/711, 748, 755, 264–268

[56] References Cited

U.S. PATENT DOCUMENTS

| 642,349 | 1/1900 | Martin . | |
|---|---|---|---|
| 1,290,446 | 3/1918 | White . | |
| 1,524,369 | 1/1925 | Ramage | 172/705 |
| 3,012,617 | 12/1961 | Anderson | 172/705 X |
| 3,084,749 | 4/1963 | Anderson | 172/705 |
| 3,108,643 | 10/1963 | Williams | 172/705 |
| 3,606,928 | 9/1971 | Ouanbeck | 172/705 |
| 3,708,019 | 1/1973 | Ryan | 172/705 |
| 4,011,915 | 3/1977 | Anderson | 172/705 |
| 4,143,718 | 3/1979 | Ouanbeck | 172/705 |
| 4,453,602 | 6/1984 | Larsen et al. | 172/707 |

FOREIGN PATENT DOCUMENTS

| 225840 | 6/1958 | Australia . | |
|---|---|---|---|
| 528761 | 8/1956 | Canada | 172/705 |
| 594258 | 3/1960 | Canada | 172/705 |
| 606458 | 10/1960 | Canada | 172/705 |
| 647375 | 8/1962 | Canada | 172/705 |
| 696516 | 10/1964 | Canada | 172/705 |
| 1096686 | 3/1981 | Canada . | |
| 1107559 | 8/1981 | Canada . | |

OTHER PUBLICATIONS

Wil-Rich Chisel Plows-Advertizing Brochure of Wil–Rich Wahpeton N.D.

Primary Examiner—Richard J. Johnson
Attorney, Agent, or Firm—Beveridge, DeGrandi & Weilacher

[57] ABSTRACT

This invention relates to an automatic release mechanism for a cultivator which provides good resistance to release of the shank holder and which upon release causes the shank holder to rise to a good height to clear obstacles encountered during operation of the cultivator. The shank holder is mounted so as to pivot about an axis and is retained in the working position by a pair of springs under tension, the forward end of the springs being mounted in front of and beneath the position of the pivot axis of the shank holder, and the moment arm of the springs is such that, as the shank holder pivots, the moment arm decreases resulting in the tangential force applied by the springs to the ground engaging tool about the pivot axis remaining substantially constant during pivoting of the shank holder to clear an obstacle.

6 Claims, 7 Drawing Figures

CHISEL PLOW RELEASE MECHANISMS

This invention relates to an automatic release mechanism for a cultivator. It has specific application to chisel plows but is not limited thereto being useful also for other types of field cultivators.

Various release mechanisms for cultivators are already known. These usually fit into two classes which will be designated herein as "spring cushions" and "automatic trips".

Spring cushion mechanisms are normally designed with two compression springs positioned vertically in front of the mounting bar. Any release mechanism in which the point pressure increases as the shank releases may be considered to be a spring cushion type. When the pressure at the forward point of the earth working tool increases to a certain value the unit begins to lift by backward rotation of the shank and shank holder, the pressure increasing with the amount of lift.

An advantage of spring cushion mechanisms is that they are economical, having few moving parts to wear out and to maintain. Also, when they release they return with a pressure approaching that at which they release. However, they have the disadvantage that they start to release at relatively low pressures so that heavy soil resistance causes them to drag back until the increased point pressure is higher than the soil resistance. This can cause ridging and rapid sweep wear. Another drawback is their normally low tripping height which means that in some cases they may not clear the obstruction.

Automatic trips normally employ an over-centre locking mechanism which requires considerable force to release. After release the force, required to raise the shank is reduced, providing relatively easy lift and greater upward movement than spring cushion mechanisms. Hence they provide much more protection for the shanks than do spring cushion mechanisms because of their reducing release pressure and increased trip height. They also have a fairly definite high pressure break point. This results in the sweeps being held quite stiffly in the working position with improved wear and working characteristics. Automatic trip mechanisms, however, have several disadvantages. They are complicated and expensive and usually have several moving parts which increase the wear possibilities. A major disadvantage is that they reset at considerably less pressure than that at which they release. This is because they use a lock-up mechanism which carries a high pressure only when it is locked. The result is that in heavy soils there is a very definite possibility that they will not reset.

The ground engaging tool of a cultivator in operation is subject to two forces, viz., horizontal force and tangential force. The horizontal force is measured in the horizontal plane and is produced by the soil flowing past and by initial impact with obstructions. The tangential force is measured in the direction in which the sweep is pointing. In normal operation it is the same as the horizontal force. However, when the sweep is released the tangential force moves more and more toward the vertical as the sweep rises. When the sweep is sliding over an obstacle such as a rock the point of the sweep exerts a tangential force on the obstacle. The tangential force is also important to consider when the ground engaging tool has to reset after releasing. It is the value of the tangential force which determines whether or not the ground engaging tool will reset into the soil.

Canadian Patent No. 946,676 issued May 7, 1974 to Sherman H. Quanbeck describes a chisel plow clamp and shank holder comprising a spring cushion mechanism which is preferable to other such prior art mechanisms in that it allows the shank and shank holder to pivot upwards providing a good clearance for obstacles. However, the force exerted by the tool does increase with increased pivoting of the shank and shank holder.

The present invention seeks to maintain the advantages of both of the spring cushion and automatic trip mechanisms while avoiding in large measure their disadvantages. Apparatus constructed in accordance with the invention releases at a relatively high pressure and yet is of a relatively simple construction. It is distinctly superior to the prior art spring cushion mechanisms in that the tangential force remains substantially constant as the shank and shank holder pivot to ride over obstacles. Moreover it has a good clearance height and a return force which is nearly equal to the release force.

The shank and shank holder are held in place in the normal earth-working position by a pair of springs under tension. Upon contact with an obstacle which applies sufficient force to the earth working tool to cause release of the mechanism the shank and shank holder pivot backwards about a pivot axis thus elevating the earth working tool. It is a very important feature of the invention that during pivoting the tangential force remains substantially constant rather than increasing as it does in the known spring cushion mechanisms. The springs pivot during release so that their moment arms about the pivot axis of the shank holder decrease as the holder pivots upward. Also, it is important that the forward pivot points of the springs are located forward of and below the pivot axis of the shank holder in order to prevent the tangential force from increasing as the shank holder pivots.

It is an object of the present invention to provide a cultivator release mechanism which releases at relatively high pressure on the earth working tool.

It is another object of the invention to provide a cultivator release mechanism which is simple in construction and which pivots to a relatively high clearance to override obstructions.

It is a further object of the invention to provide a cultivator release mechanism which exerts a return force on the release mechanism of a magnitude near to that of the release force.

It is a more specific object of the invention to provide a cultivator release mechanism which exerts a substantially constant tangential force on the earth working tool during release to rise over an obstruction.

In accordance with a broad aspect of the invention there is provided a release mechanism for an earth working tool comprising:

mounting bracket means;

means fixedly attaching said mounting bracket means to a frame member of an earth cultivator;

a shank holder;

shank pivot means, said shank pivot means mounting said shank holder to said mounting bracket means for pivotal movement in a vertical plane about a pivot axis;

a shank affixed to said shank holder at an upper portion of said shank and the earth working tool being affixed to the lower end of said shank;

spring means exerting a predetermined force maintaining said earth working tool in a lower position for earth working, said spring means extending when said earth working tool impacts an obstruction permitting said shank holder to pivot upwards so that said earth working tool rises over the obstruction, the arrangement being such that as said shank holder pivots upward said spring means pivots so that the moment arm of the force exerted by said spring means about said pivot axis decreases whereby the tangential force exerted by said earth working tool remains substantially constant.

There is also provided in accordance with the invention a cultivator release mechanism comprising:

a mounting plate extending along one side of a frame member of a cultivator;

a pair of back plates extending along a second side of said frame member;

means clamping said mounting plate and back plates to said frame member;

said mounting plate and said back plates extending downward beneath said frame member and converging so that each of said back plates lies adjacent said mounting plate over a lower portion thereof;

a mounting bracket integral with the upper portion of said mounting plate;

shank pivot means mounted on said bracket;

a shank holder pivotally attached to said bracket by said pivot means;

a shank affixed to said shank holder and having an earth working tool located on the lower end thereof;

a pair of springs under tension mounted on opposite sides of said shank holder and each having a front end and a rear end, the rear end of each spring being attached to said shank holder;

spring pivot means fixed to the lower portion of said back plates and mounting plate, the front end of each of said springs being attached at a pivot point to said spring pivot means, said spring pivot point being located lower than and forwardly of said shank pivot means, the arrangement being such that when, in operation, said ground working tool contacts an obstruction causing said shank and shank holder to pivot upwards, the tangential force exerted on said earth working tool is substantially constant over the full range of pivoting of said shank holder.

Other objects, advantages and features of the invention will become apparent from the following description of an exemplary embodiment thereof taken in conjunction with the accompanying drawings, in which.

Figure 1:
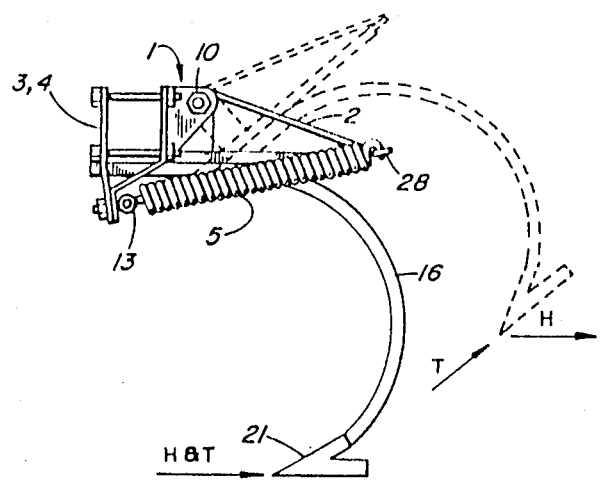
FIG. 1 is a side elevation of an automatic release mechanism in accordance with the invention.
Figure 2:
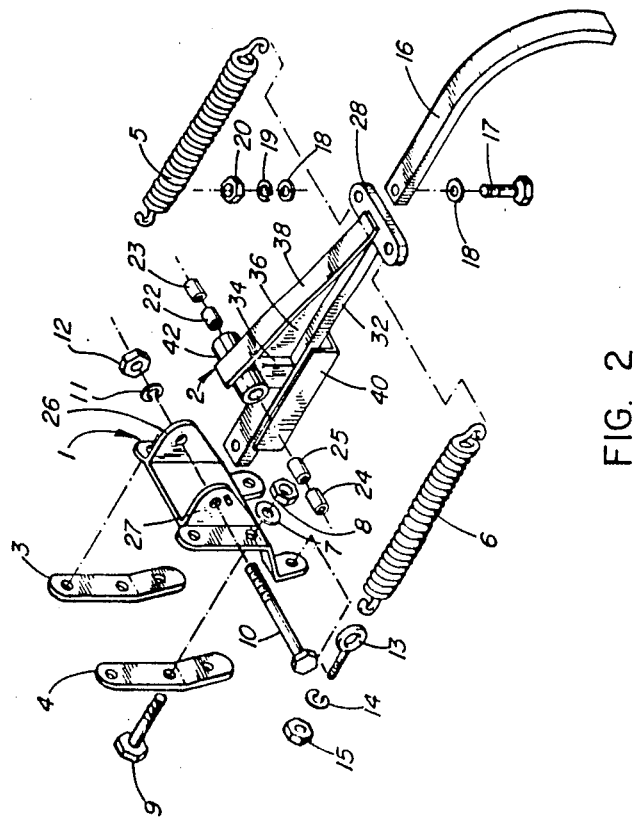
FIG. 2 is an exploded view of an automatic release mechanism in accordance with the invention.

The cultivator shank release mechanism illustrated in FIGS. 1 and 2 has as its main components base plate or mounting bracket means 1, shank holder 2, back plates 3 and 4 and tension springs 5 and 6. When assembled to the cultivator as illustrated in FIG. 1 a portion of the cultivator frame (not shown) is clamped in the rectangular space between the upper opposed portions of base plate 1 on one side and back plates 3 and 4 on the other side by means of four bolts. One of these bolts 9 and the associated washer 7 and nut 8 are shown in FIG. 2.

Base plate 1 has a pair of apertured base eyes 26 and 27 to which shank holder 2 is pivotally attached by means of shoulder bolt 10. The upper portion of shank 16 is mounted to the shank holder 2 and an earth-working tool 21 is fixedly attached to the lower end of shank 16.

As best illustrated in FIG. 1 the lower portions of the base plate 1 and back plates 3 and 4 are bent toward each other to produce together with the lower portion of the cultivator frame a triangular shape in cross-section. A pair of eye bolts 13 with associated washers 14 and nuts 15, one of each of which is shown in FIG. 2, are employed to clamp the lower portions of the back plates 3 and 4 to base plate 1 thereby providing a rigid anchor point for the forward ends of tension springs 5 and 6. The forward ends of the springs are hooked into the eyes of bolts 13.

The rear ends of springs 5 and 6 are hooked into apertures in cross-bar 28 which forms part of shank holder 2.

In the normal working position illustrated in FIG. 1 in solid lines springs 5 and 6 are under preset tension. This tension retains shank holder 2 together with shank 16 and working tool 21 firmly in the normal working position. When the working tool encounters an obstacle which exerts a sufficient backward force to overcome the force exerted by the springs the shank holder is pivoted backwards and upwards as illustrated by the phantom lines in FIG. 1.

As is clearly illustrated in FIG. 1 eyebolts are located well beneath and in front of shoulder bolt 10 about the axis of which the shank holder pivots. It is also apparent from FIG. 1 that when the shank holder pivots backward the rear ends of springs 5 and 6 pivot upwards to cause the distance between the axial centrelines of the springs and the pivot axis of the shank holder to decrease. Thus the moment arm of the force exerted by the springs decreases as the shank holder pivots. The arrangement is such that the tangential force, shown in FIG. 1 by the arrow denoted "T", remains substantially constant during pivoting of the shank holder. It is important to recognize that in order to achieve this result the front pivot points of the springs must be located both forwardly of and beneath the pivot axis of the shank holder.

When an obstacle is encountered the working tool rides over it by reason of the pivoting of the shank holder, and the earth-working tool exerts a force in the tangential direction against the obstacle. Having cleared the obstacle the earth-working tool resets to the normal operating position with a force nearly equal to the force which caused it to be released to pivot upwards. It is the tangential force which is most important to consider when the earth-working tool has to reset after releasing.

Figure 3:
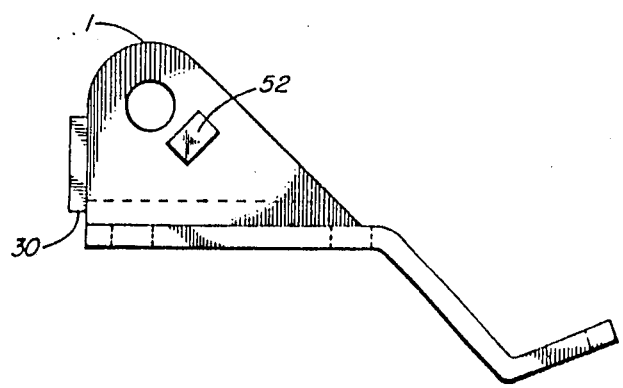
FIG. 3 is a side elevation of a support bracket in accordance with the invention.

As shown in FIG. 3 the base plate 1 includes a stop block 30 the purpose of which is to limit the pivoting of the shank holder as explained hereunder. The base plate also includes a plate 52 which is positioned so that one face of shoulder bolt 10 rests against it to prevent the shoulder bolt from turning and causing wear on the base plate.

Figure 4:
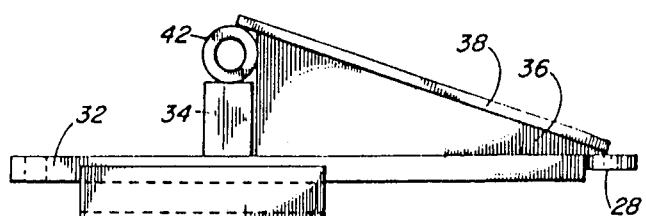
FIG. 4 is a side elevation of a shank holder in accordance with the invention.

The shank holder 2 is illustrated in FIGS. 2 and 4. It comprises a main bar 32, bearing support 34, web 36, brace 38, channel 40, bushing sheath 42 and, as previously noted, cross-bar 28 to which the rear ends of springs 5 and 6 are attached. The parts of the shank holder are rigidly affixed to one another as by welding. The extent of the pivoting of the shank holder is limited by the end 44 of brace 38 abutting against stop block 30 of base plate 1.

Four hardened self-lubricating bushings 22, 23, 24 and 25 are located in bushing sheath 42 to receive shoulder bolt 10 which is retained in place by washer 11 and nut 12. This provides a low-friction pivot for the shank holder enabling it to reset with nearly the same force as that at which it released. The shank 16 is attached to shank holder 2 by sliding it through hollow rectangular channel 40 on the bottom of the holder and securing it with bolt 17, washers 18, lockwasher 19 and nut 20.

Figure 5:
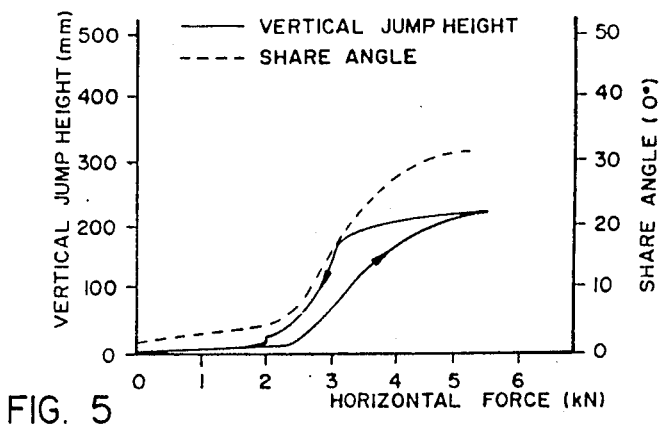
FIG. 5 is a graph illustrating the characteristics of a spring cushion mechanism.

FIG. 5 illustrates the characteristics of a known spring cushion mechanism. In this figure the solid curve shows the vertical jump height or rise of the shank holder versus force exerted. It is evident that the force upon release (lower portion of curve) increases very substantially as the shank holder rises. The reset force (upper portion of curve) is somewhat but not too greatly lower than the release force.

Figure 6:
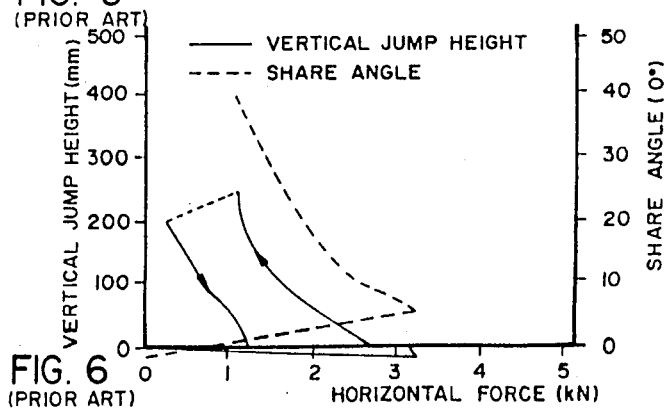
FIG. 6 is a graph illustrating the characteristics of an automatic trip mechanism.

FIG. 6 illustrates the characteristics of a known automatic trip mechanism. Here it is seen that the force decreases quite rapidly as the shank holder rises and also that the reset force is much lower than the force upon release. Thus there is the disadvantage with this type of mechanism that the reset force may be insufficient to cause the earth-working tool to re-penetrate the ground after clearing an obstacle.

Figure 7:
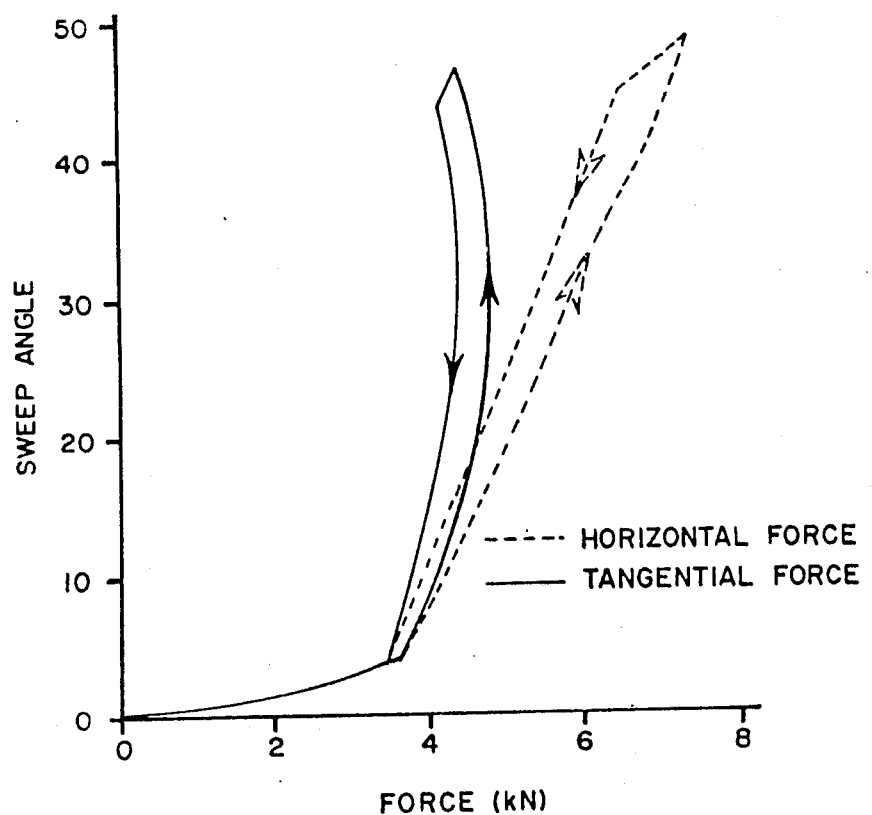
FIG. 7 is a graph illustrating the characteristics of a cultivator release mechanism in accordance with the invention.

FIG. 7 illustrates the characteristics of a shank release mechanism in accordance with the invention. In this case it is seen that a very substantial force is required to effect release and consequent pivoting of the shank holder. However, after release the tangential force remains substantially constant as the shank holder pivots upward to clear an obstacle. Moreover, the reset force is only slightly less than the release force and also remains substantially constant upon resetting.

Although only a single embodiment of the invention has been described many modifications and variants may be devised by those skilled in the art. Accordingly, the foregoing embodiment is to be considered as illustrative only rather than restrictive of the invention and all such modifications and variants as come within the meaning and range of equivalency of the appended claims are to be included.

The embodiments of the invention in which an exclusive property or privilege is claimed are defined as follows:

1. A cultivator shank release mechanism comprising:
    a mounting plate extending along one side of a frame member of a cultivator;
    a pair of back plates extending along a second side of said frame member;
    means clamping said mounting plate and back plates to said frame member;
    said mounting plate and said back plates extending downward beneath said frame member and converging so that each of said back plates lies adjacent said mounting plate over a lower portion thereof;
    a mounting bracket integral with the upper portion of said mounting plate;
    shank pivot means mounted on said bracket;
    a shank holder pivotally attached to said bracket by said pivot means;
    a shank affixed to said shank holder and having an earth working tool located on the lower end thereof;
    a pair of springs under tension mounted on opposite sides of said shank holder and each having a front end and a rear end, the rear end of each spring being attached to said shank holder;
    spring pivot means fixed to the lower portion of said back plates and mounting plate, the front end of each of said springs being attached at respective pivot points to said spring pivot means, said spring pivot points being located lower than and forwardly of said shank pivot means, the arrangement being such that when, in operation, said ground working tool contacts an obstruction causing said shank and shank holder to pivot upwards, the tangential force exerted on said earth working tool is substantially constant over the full range of pivoting of said shank holder.

2. A cultivator shank release mechanism as claimed in claim 1 wherein said means clamping said mounting plate and said back plates to said frame member comprise first and second bolt means located above and below said frame member respectively.

3. A cultivator shank release mechanism as claimed in claim 2 wherein the lower portion of said frame member and the lower converging portions of said mounting plate and back plates form in side elevation a substantially triangular section.

4. A cultivator shank release mechanism as claimed in claim 1 wherein said spring pivot means comprises a pair of eye bolts, each of said eye bolts extending through and clamping together the lower portions of one of said back plates and said mounting plate, the front end of each of said springs being attached to the eye of the respective eyebolt.

5. A cultivator shank release mechanism attachable to a frame member of an earth cultivator, the frame member having an upper portion, the shank release mechanism comprising:
    mounting bracket means;
    means fixedly attaching said mounting bracket means to the frame member;
    a cultivator shank holder including (a) shank pivot means mounting said cultivator shank holder to said mounting bracket means for pivotal movement of said shank holder in a vertical plane about a pivot axis of said pivot means, (b) a base member having a forward portion which extends forwardly to lie under the frame member, and (c) a rearwardly extending spring retaining means mounted rearwardly of said pivot axis on said base member;
    said shank pivot means and said pivot axis being located above said shank holder base member and to the rear of the upper portion of the frame member;
    a cultivator shank having an upper portion affixed to said shank holder and an earth working tool affixed to the lower end of said shank;
    spring means interconnecting said mounting bracket means and said shank holder and exerting a predetermined force maintaining said earth working tool in a lower position for earth working, said spring means extending when said earth working tool impacts an obstruction to permit said shank holder to pivot upwards about said pivot axis so that said earth working tool rises over the obstruction; said spring means having a forward end pivotally connected to said mounting bracket means at a pivot point forward of and beneath both said pivot axis of said shank pivot means and said spring retaining means mounted on said base member and a rear end pivotally connected to said spring retaining means of said shank holder base member so that, as said shank holder pivots upwardly, said rear end of said spring means pivots upwardly so that the distance between the axial centerlines of said spring means and the pivot axis of said shank holder decreases and the moment arm of the force exerted by said spring means about said pivot axis decreases whereby the tangential force exerted by said earth working tool remains substantially constant.

6. A release mechanism for an earth working tool as claimed in claim 5 wherein said spring means comprises a pair of coil springs located on either side of said shank holder.

* * * * *